United States Patent [19]

Blessing et al.

[11] Patent Number: 4,758,816
[45] Date of Patent: Jul. 19, 1988

[54] ELECTRICAL RESISTOR

[75] Inventors: Rolf Blessing, Schmitten; Wolfgang Adamitzki, Sulzbach, both of Fed. Rep. of Germany

[73] Assignee: VDO Adolf Schindling AG, Frankfurt am Main, Fed. Rep. of Germany

[21] Appl. No.: 764,872

[22] Filed: Aug. 12, 1985

[30] Foreign Application Priority Data

Aug. 11, 1984 [DE] Fed. Rep. of Germany ....... 3429649

[51] Int. Cl.$^4$ .......................... H01C 1/012; G01L 1/22
[52] U.S. Cl. .......................................... 338/314; 338/2
[58] Field of Search ................ 338/308, 309, 314; 252/528, 521; 427/202, 204, 205

[56] References Cited

U.S. PATENT DOCUMENTS

| | | | |
|---|---|---|---|
| 3,996,551 | 12/1976 | Croson | 338/309 |
| 4,016,525 | 4/1977 | Maher et al. | 338/309 |
| 4,081,315 | 3/1978 | Templin | 338/308 |
| 4,231,011 | 1/1980 | DelVecchio et al. | 338/2 |
| 4,280,114 | 7/1981 | DelVecchio et al. | 338/2 |
| 4,485,370 | 11/1984 | Poisel | 338/314 |

Primary Examiner—C. L. Albritton
Attorney, Agent, or Firm—Martin A. Farber

[57] ABSTRACT

An electrical resistor having a resistance layer 4 of a cermet material applied to a support 1 as well as contact layers 5 associated with said resistance layer 4, the resistor being subjected to heat treatment. A metallic, electrically non-conductive layer 3 is arranged between support 1 and resistance layer 4.

21 Claims, 1 Drawing Sheet

ELECTRICAL RESISTOR

BACKGROUND OF THE INVENTION

The invention relates to an electrical resistor having a resistance layer of a cermet material applied to a support and contact layers associated with said resistance layer, the resistor being subjected to a heat treatment.

When known electrical resistors of this kind are used as strain gauges there is the problem, on the one hand, that sensitivities having a gauge factor of only about 5 can be obtained, which results in increased expense in connection with the subsequent evaluation circuit.

There is also the problem that only poor reproducibility of the gauge factor values is obtained.

It is an object of the invention to create an electrical resistor of the above type which is of readily reproducible high sensitivity.

SUMMARY OF THE INVENTION

According to the invention, a metallic, electrically non-conductive layer (3) is arranged between support (1) and resistance layer (4) or on the side of the resistance layer (4) facing away from the support (1). By this construction, a resistor having a gauge factor of 10 can be obtained in readily reproducible manner. Due to the fact that the layer which is adjacent to the resistance layer is not electrically conductive, there cannot occur any parallel shunting which impairs the operation of the resistor.

The non-conductive character of the layer (3) can be obtained, for instance, in the manner that said layer (3) is of very slight thickness, on the order of magnitude of 10 Å.

Another possibility for obtaining the non-conductive character consists in developing the non-conductive layer in island fashion, the island spacings being about 10 μm. This island-shaped development has the advantage that the thickness of the layer is substantially unimportant.

If the resistance layer (4) consists of chromium-silicon monoxide then the temperature coefficient can be determined by the percentage of silicon monoxide. In this way reproducible operation of the resistor is assured even at temperatures of about 200° C.

The non-conductive layer preferably consists of the same metal as the metallic portion of the cermet layer so that it is advantageous for the non-conductive layer (3) to consist of chromium when the resistance layer consists of chromium-silicon oxide.

In order to avoid having the material of the support impair the electrical properties of the resistance layer and of the non-conductive layer, an insulation and/or diffusion barrier layer (2) can be arranged between the support (1) and the non-conductive layer (3).

The layers to be applied onto the support can be applied with great uniformity of structure and in slight thickness if the resistance layer (4) and/or the non-conductive layer (3) and/or the contact layers (5) and/or the insulation and diffusion barrier layer (2) are applied by vapor deposition, the resistance layer being preferably applied by simultaneous vapor deposition.

However, the layers can also be applied by other methods, the resistance layer (4) and/or the non-conductive layer (3) and/or the contact layers (5) and/or the insulation and diffusion and barrier layer (2) being applied, for instance, by sputtering.

In order to increase the reproducibility of the gauge factors the resistor can be heat-treated in vacuum, the vacuum serving to prevent corrosion of the layers.

Such corrosion can also be avoided by heat-treating the resistor in a corrosion-preventing inert-gas atmosphere or in the manner that the resistor is covered by a protective layer (7) which is applied prior to the heat treatment. The protective layer (7) may consist of silica or of polyimide.

The resistor is preferably heat-treated for about one hour.

The resistor is heat-treated at temperatures of about 400° C. to 600° C. and preferably about 500° C to 550° C.

The contact layers can be arranged approximately in the same plane and at a slight distance from the resistance layer. This has the advantage that the material of the contact layers which serve as solder contacts and for which copper can be used, cannot diffuse into the resistance layer and impair the electrical properties thereof.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
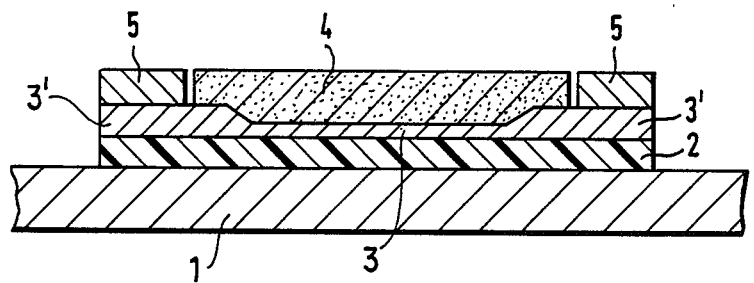
FIG. 1 is a first embodiment of a resistor according to the invention shown in cross section.

The resistors shown in the figures have a support 1 which may consist, for instance, of glass or metal. An insulation and diffusion barrier layer 2 which in its turn bears a metallic non-conductive layer 3 of chromium, is applied to the support 1.

A resistance layer 4 of a cermet material, namely chromium-silicon monoxide, is arranged over the non-conductive layer 3 in such a manner as to leave the end regions 3' of the non-conductive layer 3 free.

Contact layers 5 of copper are applied to the ends 3' of the non-conductive layer 3 which are not covered by the resistance layer 4, said contact layers serving as solder points for connection to a measurement circuit. Between the contact layers 5 and the resistance layer 4 there is a small distance 6 by which diffusion from the contact layers 5 into the resistance layer 4 is prevented. At the same time, however, this distance is so slight that the electrical conductivity between the resistance layer 4 and the contact layers 5 is not impaired. This distance 6 is particularly advantageous in the case of fine structures of the resistance layer 4.

An electrically conductive bridging is obtained by the end regions 3' of the layer 3, which regions are developed with substantially greater thickness and are thus conductive. The non-conductive layer 3 in this disclosure and the claims does not refer to the conductive thickened end region 3' but only refer to the non-conductive thinner portion.

Figure 2:
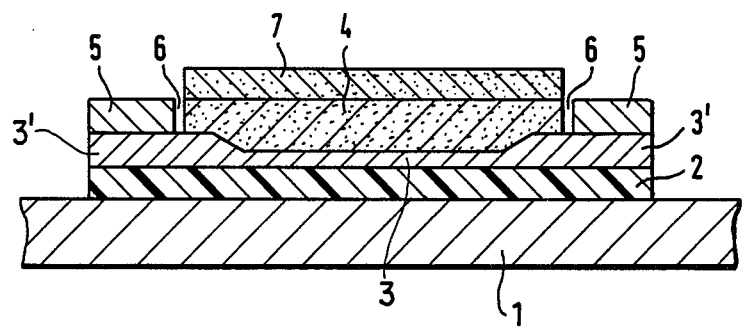
FIG. 2 is a second embodiment of a resistor according to the invention, shown in cross section.

In FIG. 2 the resistance layer 4 is covered by a protective layer 7 which consists of silica.

This protective layer 7 serves to prevent corrosion of the resistance layer 4 when the resistor is subjected to heat treatment after the application of the layers.

In order to prevent corrosion in the case of the embodiment shown in FIG. 1, the heat treatment in this case is carried out in a vacuum or in an inert-gas atmosphere.

We claim:

1. An electrical resistor comprising a support, a resistance layer of a cermet material carried by the support, contact layers associated with said resistance layer and carried by said support, and a metallic, electrically nonconductive layer disposed alongside said resistance layer; and wherein said nonconductive layer is provided with conductive end portions extending from said resistance layer to said contact layers to provide electrical connection between said contact layers and said resistance layer.

2. The electrical resistor according to claim 1, wherein the nonconductive layer is formed of very slight thickness, on the order of magnitude of 10 angstroms, and the resistor is subjected to a heat treatment.

3. The electrical resistor according to claim 1, wherein the nonconductive layer is formed as islands.

4. The electrical resistor according to claim 3, wherein spacings between adjacent ones of said islands are about 10 micrometers.

5. The electrical resistor according to claim 1, wherein the resistance layer is made of chromium-silicon monoxide, the resistor is subjected to a heat treatment and said nonconductive layer is positioned between said support and said resistance layer.

6. The electrical resistor according to claim 5, wherein the nonconductive layer is made of chromium-silicon oxide, and said nonconductive layer is positioned on the side of said resistance layer facing away from said support.

7. The electrical resistor according to claim 1, further comprising an insulation barrier layer disposed between said support and said nonconductive layer.

8. The electrical resistor according to claim 7, wherein any of said layers are applied by vapor deposition including simultaneous vapor deposition.

9. The electrical resistor according to claim 7, wherein any of said layers are applied by sputtering.

10. The electrical resistor according to claim 1, wherein the resistor is subjected to a heat treatment, the resistor being heat-treated in vacuum in order to increase the reproducibility of the gauge factor of the electrical resistor, the vacuum serving to prevent corrosion of the layers.

11. The electrical resistor according to claim 1, wherein the resistor is subjected to a heat treatment in a corrosion-preventing inert-gas atmosphere to prevent corrosion of the layers.

12. The electrical resistor according to claim 1, wherein the resistor is subjected to a heat treatment in the manner that the resistor is covered by a protective layer which is applied prior to the heat treatment.

13. The electrical resistor according to claim 12, wherein the protective layer consists of silica.

14. The electrical resistor according to claim 12, wherein the protective layer consists of polyimide.

15. The electrical resistor according to claim 1, wherein the resistor is subjected to a heat treatment, the resistor being heat-treated preferably for about one hour 16. The electrical resistor according to claim 1, wherein the resistor is subjected to a heat treatment, the resistor being heat-treated at temperatures of about 400° C. to 600° C.

17. The electrical resistor according to claim 1, wherein the resistor is subjected to a heat treatment, the resistor being heat-treated at temperatures of preferably 500° C. to 550° C.

18. The electrical resistor according to claim 1, wherein a diffusion barrier layer is disposed between said support and said nonconductive layer.

19. An electrical strain gauge resistor comprising a support, a resistance layer of a cermet material carried by the support, contact layers associated with said resistance layer and carried by said support, a metallic, electrically nonconductive layer disposed alongside said resistance layer; and wherein the resistance layer is formed of chromium and an oxide of silicon;

said nonconductive layer is positioned between said support and said resistance layer.

said nonconductive layer is provided with conductive end portions extending from said resistance layer to said contact layers to provide electrical connection between said contact layers and said resistance layer.

20. The electrical strain gauge resistor according to claim 19, wherein the resistance layer is covered by a protective layer, and the protective layer consists of polyimide.

21. The electrical strain gauge resistor according to claim 20, wherein the nonconductive layer is formed of very slight thickness, on the order of magnitude of 10 angstroms.

* * * * *